United States Patent
Iizuka

(10) Patent No.: US 10,911,986 B2
(45) Date of Patent: Feb. 2, 2021

(54) WIRELESS COMMUNICATION DEVICE, WIRELESS COMMUNICATION SYSTEM, AND WIRELESS COMMUNICATION METHOD

(71) Applicant: NEC CORPORATION, Tokyo (JP)

(72) Inventor: Takuji Iizuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/470,655

(22) PCT Filed: Dec. 15, 2017

(86) PCT No.: PCT/JP2017/045020
§ 371 (c)(1),
(2) Date: Jun. 18, 2019

(87) PCT Pub. No.: WO2018/116965
PCT Pub. Date: Jun. 28, 2018

(65) Prior Publication Data
US 2019/0327643 A1  Oct. 24, 2019

(30) Foreign Application Priority Data
Dec. 22, 2016 (JP) ................. 2016-249574

(51) Int. Cl.
*H04W 28/08* (2009.01)
*H04W 72/04* (2009.01)
(Continued)

(52) U.S. Cl.
CPC ........... *H04W 28/08* (2013.01); *H04W 72/04* (2013.01); *H04L 43/0852* (2013.01); *H04L 47/283* (2013.01)

(58) Field of Classification Search
CPC ..... H04W 28/08; H04W 72/04; H04W 16/32; H04L 5/0044; H04L 47/283; H04L 1/0071
See application file for complete search history.

(56) References Cited

U.S. PATENT DOCUMENTS

2012/0287855 A1* 11/2012 Kishigami ............ H04L 1/0071
370/328

FOREIGN PATENT DOCUMENTS

JP    2001-168905 A    6/2001
JP    2010-258606 A    11/2010
(Continued)

OTHER PUBLICATIONS

Written Opinion for PCT/JP2017/045020, dated Feb. 27, 2018.
International Search Report for PCT/JP2017/045020, dated Feb. 27, 2018.

*Primary Examiner* — Vinncelas Louis
(74) *Attorney, Agent, or Firm* — Sughrue Mion, PLLC

(57) ABSTRACT

The present invention addresses the problem of an increase in transmission delay when a communication is performed using a plurality of wireless transmission devices having different wireless transfer delays if a plurality of wireless lines are regarded as a single wireless line. A wireless communication device according to the present invention includes: a dividing means for dividing a data signal string into a plurality of divided signal strings; and an allocation means for allocating the divided signal strings to at least one of a plurality of wireless transmission means having different wireless transfer delays on the basis of a transmission delay due to the intermediation of the wireless transmission means.

13 Claims, 9 Drawing Sheets

(51) Int. Cl.
  *H04L 12/841*     (2013.01)
  *H04L 12/26*      (2006.01)

(56) References Cited

FOREIGN PATENT DOCUMENTS

JP   2012-015667 A       1/2012
WO   2014/045319 A1      3/2014
WO   WO-2014174768 A1 *  10/2014  ............ H04W 28/08
WO   2016/125775 A1      8/2016

* cited by examiner

WIRELESS COMMUNICATION DEVICE, WIRELESS COMMUNICATION SYSTEM, AND WIRELESS COMMUNICATION METHOD

CROSS REFERENCE TO RELATED APPLICATIONS

This Application is a National Stage of International Application No. PCT/JP2017/045020 filed Dec. 15, 2017, claiming priority based on Japanese Patent Application No. 2016-249574 filed Dec. 22, 2016, the disclosure of which is incorporated herein in its entirety by reference.

TECHNICAL FIELD

The present invention relates to a radio communication device, a radio communication system, and a radio communication method, in particular, relates to a radio communication device, a radio communication system, and a radio communication method using a plurality of radio lines.

BACKGROUND ART

In a radio communication system, a link aggregation technique is used for expanding a transmission band between radio communication devices. Herein, the link aggregation technique is a technique that virtually bundles a plurality of physical lines into one, and enables use of bandwidth depending on a total amount of the bands of the physical lines. PTL 1 describes one example of a radio transmission system using such a link aggregation technique.

A related radio transmission system described in PTL 1 includes a radio device for demultiplexing radio frames on a radio link basis in a data link layer, the radio frames being transmitted in a radio section where a plurality of radio links are multiplexed. This radio device includes an aggregation switch and a radio entrance portion.

The aggregation switch reassembles network frames used in an external network into multi-radio-line (MRL) frames. Then, the aggregation switch allocates the MRL frames on a radio link basis, and aggregates and reassembles the MRL frames on a radio link basis into the network frames.

The radio entrance portion converts the MRL frames allocated by the aggregation switch into radio frames, and transmits the converted radio frames to each of the radio links in the radio section. Then, the radio entrance portion receives the radio frames from each of the radio links in the radio section, converts the received radio frames into MRL frames, and outputs the MRL frames to the aggregation switch.

According to the related radio transmission system, it is supposed that such a configuration can provide a transmission system capable of responding promptly to a change in a link situation, and executing link control with a high load sharing effect.

Further, PTLs 2 and 3 describe techniques as a related technique.

CITATION LIST

Patent Literature

[PTL 1] Japanese Unexamined Patent Application Publication No. 2010-258606

[PTL 2] Japanese Unexamined Patent Application Publication No. 2012-015667

[PTL 3] Japanese Unexamined Patent Application Publication No. 2001-168905

SUMMARY OF INVENTION

Technical Problem

As described above, the related radio transmission system described in PTL 1 is configured to reassemble network frames into MRL frames, and to allocate the MRL frames on a radio link basis. Then, the MRL frames on a radio link basis are aggregated and reassembled into the network frames.

A method for allocating MRL frames on a radio link basis includes a round robin method, an allocation method based on communication speed, and the like. However, when MRL frames (divided frames) divided into a plurality of radio lines having different radio transmission delays are allocated, there is a problem that a transmission delay increases by being allocated to a radio device having a large radio transmission delay. Herein, a transmission delay refers to a delay time occurring from divided frames being allocated and then being transmitted through a plurality of radio links until the divided frames reaching a processing unit where the divided frames are reassembled into network frames. Specifically, as illustrated in FIG. 9, when divided frames are excessively allocated to a radio device A (lower part of FIG. 9) having a large radio transmission delay (a narrow radio band), the divided frames are retained in the radio device A. In this case, divided frames in a radio device B (upper part of FIG. 9) having a small radio transmission delay (a wide radio band) wait for sending out the divided frames from the radio device A, resulting in a large transmission delay.

Further, even when an input rate of the divided frames is equal to or less than a radio rate of the radio device B having the small radio transmission delay, the divided frames can be allocated to the radio device A having the large radio transmission delay. Therefore, this case also results in a large transmission delay.

Such a problem caused by a difference in transmission delays is particularly exhibited when radio bands are widely different from each other such as a combination of a license band (e.g., 700 MHz band to 2 GHz band) allocated to a telecommunications carrier and E-band (70 GHz to 80 GHz) in a millimeter wave band. On the other hand, in a 5th Generation (5G) mobile communication system and the like, adoption of a technique (Dual Connectivity) that connects to both a low frequency band and a high frequency band is examined in order to improve user throughput. However, when the problem caused by a difference in transmission delays described above occurs, it becomes difficult to achieve ultra-reliable and low-latency communications (URLLC).

Thus, there is a problem of an increase in transmission delay, when a communication is performed by using a plurality of radio transmission devices having different radio transmission delays and regarding a plurality of radio lines as a single radio line.

An object of the present invention is to provide a radio communication device, a radio communication system, and a radio communication method that solve the problem described above, that is to say, an increase in transmission delay, when a communication is performed by using a plurality of radio transmission devices having different radio transmission delays and regarding a plurality of radio lines as a single radio line.

Solution to Problem

A radio communication device, according to the present invention, includes: dividing means for dividing a data signal string into a plurality of divided signal strings; and allocating means for allocating the divided signal strings to at least one of a plurality of radio transmission means having different radio transmission delays, based on a transmission delay caused by passing through the radio transmission means.

A radio communication system, according to the present invention, includes: a first radio communication device that includes dividing means for dividing a data signal string into a plurality of divided signal strings, a plurality of radio transmission means for transmitting each of the divided signal strings with a different radio transmission delay, and allocating means for allocating the divided signal strings to at least one of the plurality of radio transmission means, based on a transmission delay caused by passing through the radio transmission means; and a second radio communication device that includes a plurality of radio reception means for receiving the divided signal strings transmitted by the plurality of radio transmission means and generating received divided signal strings, and assembling means for reproducing the data signal string from the received divided signal strings.

A radio communication method, according to the present invention, includes: dividing a data signal string into a plurality of divided signal strings; and allocating the divided signal strings to at least one of a plurality of radio transmission means having different radio transmission delays, based on a transmission delay caused by passing through the radio transmission means.

Advantageous Effects of Invention

The radio communication device, the radio communication system, and the radio communication method according to the present invention enable suppression of an increase in transmission delay, even when a communication is performed by using a plurality of radio transmission devices having different radio transmission delays and regarding a plurality of radio lines as a single radio line.

EXAMPLE EMBODIMENT

Example embodiments of the present invention will be described below with reference to the drawings.

First Example Embodiment

Figure 1:
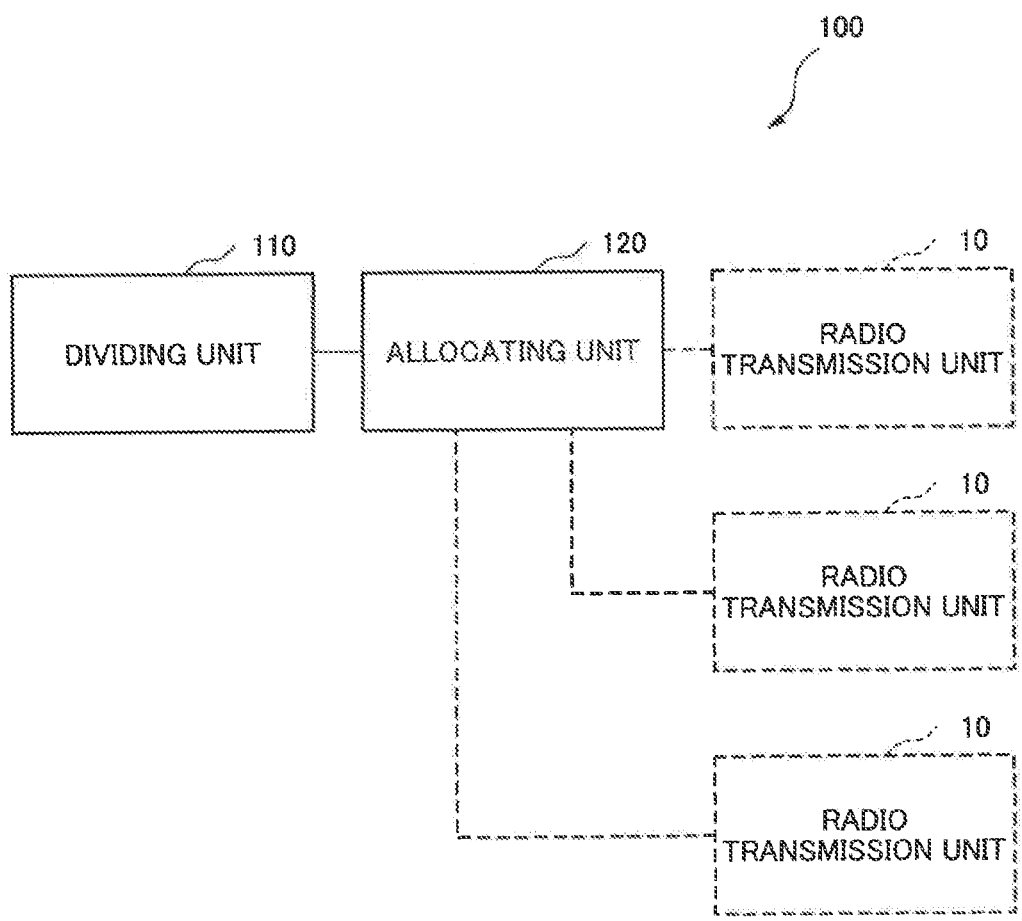
FIG. 1 is a block diagram illustrating a configuration of a radio communication device according to a first example embodiment of the present invention.

FIG. 1 is a block diagram illustrating a configuration of a radio communication device 100 according to a first example embodiment of the present invention. The radio communication device 100 according to the present example embodiment includes a dividing unit (dividing means) 110 and an allocating unit (allocating means) 120.

The dividing unit 110 divides a data signal string into a plurality of divided signal strings. The allocating unit 120 allocates the divided signal strings to at least one of a plurality of radio transmission units (radio transmission means) 10 having different radio transmission delays, based on a transmission delay caused by passing through the radio transmission unit 10.

In this way, the radio communication device 100 according to the present example embodiment is configured to allocate divided signal strings, based on not only a radio transmission delay but also a transmission delay including a delay which is caused by passing through the radio transmission unit 10 due to other than the radio transmission delay. Therefore, it is possible to avoid a delay caused by waiting for sending out the divided signal strings due to a difference of the radio transmission delay. In other words, the radio communication device 100 of the present example embodiment enables suppression of an increase in transmission delay, even when a communication is performed by using a plurality of radio transmission devices having different radio transmission delays and regarding a plurality of radio lines as a single radio line.

The transmission delay described above refers to a delay time occurring from the divided signal strings being allocated to the plurality of radio transmission units 10 in the allocating unit 120 and then being performed radio transmission through the plurality of radio transmission units 10, until the divided signal strings reaching a processing unit at a reception side where the divided signal strings are reassembled into the original data signal. In other words, the transmission delay includes a radio transmission delay and a retention delay caused by divided signal strings being retained in the radio transmission unit 10. Herein, the radio transmission delay includes a first delay based on a radio transmission speed determined by a modulation method of the radio transmission unit 10 and the like and a second delay based on a processing time for the divided signal strings. The second delay includes, for example, a delay by error-correction encoding.

The dividing unit 110 can be configured to divide a data signal string into fixed-length divided signal strings. Further, the allocating unit 120 can be configured to allocate the divided signal strings to a radio transmission unit 10 having a minimum transmission delay among the plurality of radio transmission units 10. This configuration enables the divided signal strings to be reassembled in order of arrival at a reception side, and thereby the original data signal string can be reproduced. Therefore, since it is not necessary to add a sequence identifier (ID) to each divided signal string, a decrease in throughput caused by an increase in overhead can be avoided. Further, in the processing unit at the reception side where the divided signal strings are reassembled, a memory resource for waiting for an arrival of each divided signal string is not required.

Next, a radio communication method according to the present example embodiment is described.

First, in the radio communication method according to the present example embodiment, a data signal string is divided into a plurality of divided signal strings. Then, the divided signal strings are allocated to at least one of a plurality of radio transmission units having different radio transmission delays, based on a transmission delay caused by passing through the radio transmission unit.

Herein, with regard to the allocation of the divided signal strings, it can be configured to include the allocation of the divided signal strings to the radio transmission unit having a minimum transmission delay among the plurality of radio transmission units.

As described above, the radio communication device 100 and the radio communication method of the present example embodiment enable suppression of an increase in transmission delay, even when a communication is performed by using a plurality of radio transmission devices having different radio transmission delays and regarding a plurality of radio lines as a single radio line.

Second Example Embodiment

Figure 2:
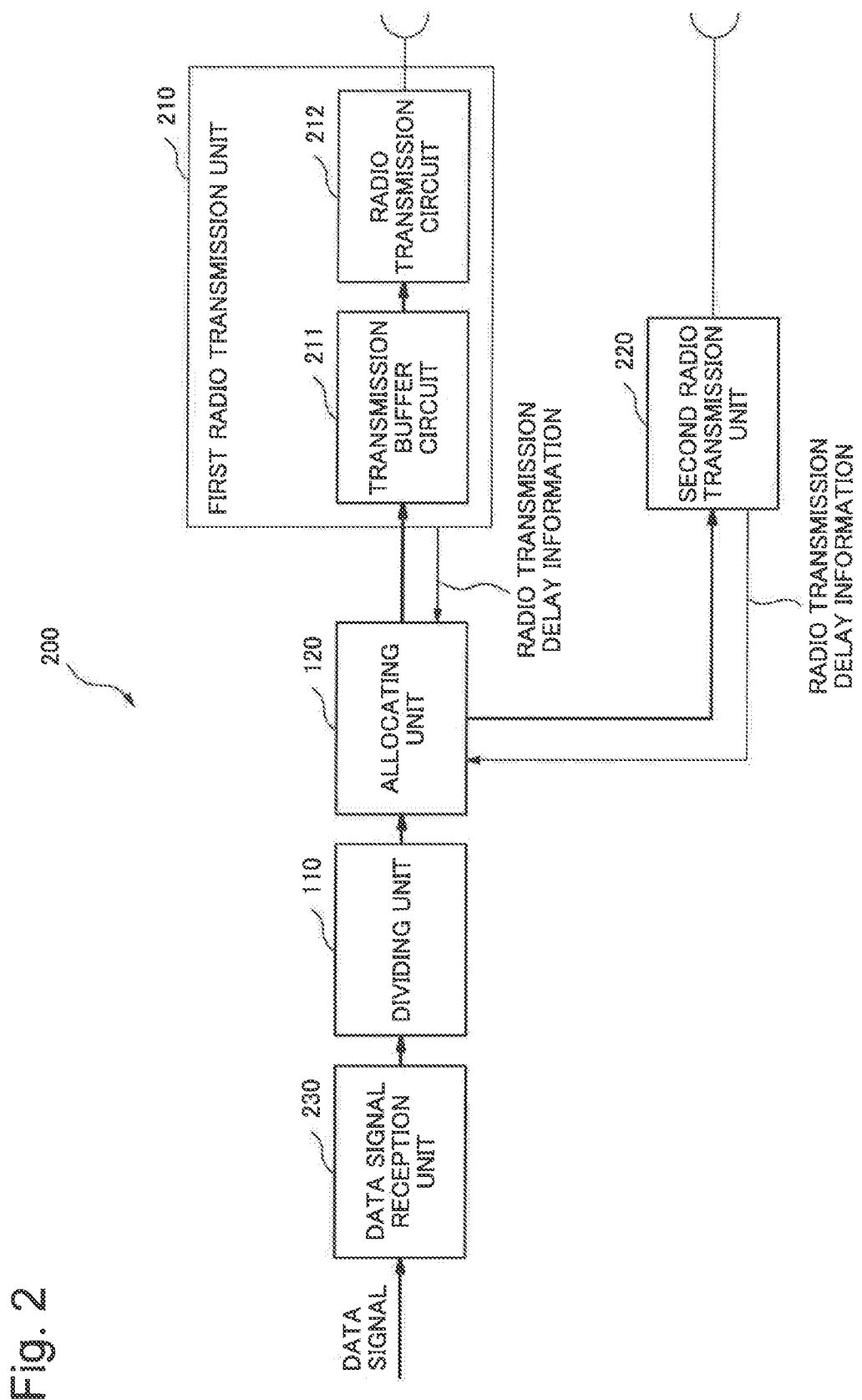
FIG. 2 is a block diagram illustrating a configuration of a radio communication device according to a second example embodiment of the present invention.

Next, a second example embodiment of the present invention is described. FIG. 2 is a block diagram illustrating a configuration of a radio communication device 200 according to the second example embodiment of the present invention.

The radio communication device 200 according to the present example embodiment includes a dividing unit (dividing means) 110 and an allocating unit (allocating means) 120. The configurations thereof are similar to the radio communication device 100 according to the first example embodiment. The radio communication device 200 according to the present example embodiment are configured to further include a first radio transmission unit 210 and a second radio transmission unit 220, as a plurality of radio transmission means, and a data signal reception unit 230.

The first radio transmission unit 210 transmits a digital signal with a first radio transmission delay. The second radio transmission unit 220 transmits a digital signal with a second radio transmission delay larger than the first radio transmission delay. The data signal reception unit 230 receives a data signal (data signal string). Herein, a data signal is, for example, a data signal string (frame) in a data link layer and, typically, an Ethernet (registered trademark) signal.

The dividing unit 110 divides a data signal string into a plurality of divided signal strings. The allocating unit 120 allocates the divided signal strings to the first radio transmission unit 210 and, when a retention delay in the first radio transmission unit 210 is equal to or larger than the second radio transmission delay, the allocating unit 120 allocates the divided signal strings to the second radio transmission unit 220.

Herein, the first radio transmission unit 210 and the second radio transmission unit 220 each can be configured to include a transmission-side buffer circuit (transmission-side buffer means) 211 and a radio transmission circuit 212. In this case, the retention delay refers to a delay until all of the divided signal strings retained in the transmission-side buffer circuit 211 are transmitted by radio transmission.

Thus, in the radio communication device 200 of the present example embodiment, first, divided signal strings (divided packets) are allocated only to the first radio transmission unit 210 having a small radio transmission delay. Then, in the first radio transmission unit 210, retention of the divided packets occurs. When the retention delay of the accumulated divided packets in the first radio transmission unit 210 becomes larger than the radio transmission delay (second radio transmission delay) in the second radio transmission unit 220 having a larger radio transmission delay, the divided packets are allocated to the second radio transmission unit 220.

With such a configuration, a maximum transmission delay in a case of maximum use of a radio bandwidth of the first radio transmission unit 210 and the second radio transmission unit 220 is the radio transmission delay in the second radio transmission unit 220. Therefore, the radio communication device 100 of the present example embodiment enables suppression of an increase in transmission delay, even when a communication is performed by using a plurality of radio transmission devices having different radio transmission delays and regarding a plurality of radio lines as a single radio line.

Next, an operation of the radio communication device 200 according to the present example embodiment is described.

The data signal reception unit 230 receives a data signal. The dividing unit 110 divides the data signal into a fixed length, and generates divided packets. Herein, variation in the radio transmission delay does not occur, when a modulation method in the first radio transmission unit 210 and the second radio transmission unit 220 is fixed. Thereby, since a transmission order of the divided packets at the radio transmission side and a reception order of the divided packets at the radio reception side become the same, it is not necessary to add a sequence ID to the divided packets. Therefore, since an increase in overhead (OVH) for adding a sequence ID does not occur, it is possible to use a radio band efficiently.

The allocating unit 120 acquires pieces of information (radio transmission delay information) related to the radio transmission delays from each of the first radio transmission unit 210 and the second radio transmission unit 220. Then, the divided packets are allocated only to the first radio transmission unit 210 having the small radio transmission delay. Herein, the radio transmission delay information includes a delay time (transmission delay) occurring from the divided packets being allocated to the first radio transmission unit 210 (the second radio transmission unit 220) until the divided packets reaching an assembling circuit for assembling divided packets included in an opposite radio communication device. Note that a delay parameter includes a first delay due to a radio transmission rate determined by a transmission modulation method and the like and a second delay such as a delay determined by an error-correction encoding method or a processing time for divided packets.

Note that variation in the radio transmission delay does not occur, when a modulation method in the first radio transmission unit 210 and the second radio transmission unit 220 is fixed. Therefore, the allocating unit 120 may be configured to hold information related to the radio transmission delay as a fixed parameter.

The first radio transmission unit 210 transmits the divided packets sequentially. At this moment, when the divided packets are input with a higher rate than the radio transmission rate, the divided packets are retained in the transmission-side buffer circuit 211.

The allocating unit 120 allocates the divided packets to the second radio transmission unit 220 when a delay (retention delay) of the divided packets retained in the transmission-side buffer circuit 211 included in the first radio transmission unit 210 becomes equal to or larger than the radio transmission delay in the second radio transmission unit 220.

The above operation according to the radio communication device 200 of the present example embodiment enables suppression of an increase in transmission delay with using a radio band efficiently.

Figure 3:
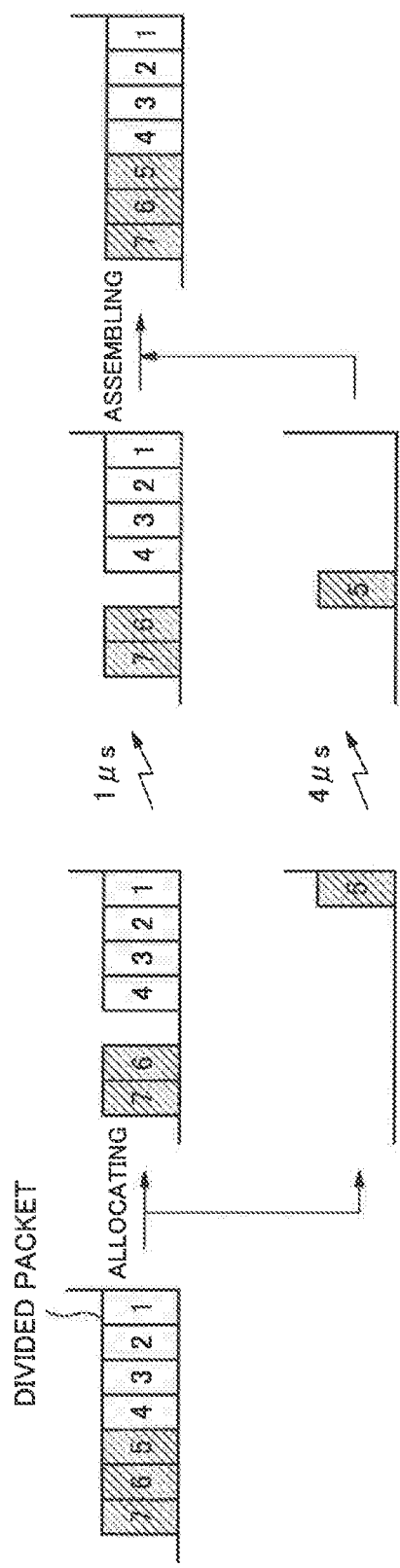
FIG. 3 is a schematic diagram illustrating an operation for allocating a divided packet by the radio communication device according to the second example embodiment of the present invention.

Next, with reference to FIG. 3, an operation for allocating a divided packet by the radio communication device 200 is further described in detail.

It is assumed that a transmission delay time of a divided packet in the first radio transmission unit 210 is 1 microsecond (µs) (upper part of FIG. 3) and a transmission delay time in the second radio transmission unit 220 is 4 µs (lower part of FIG. 3). In this case, while the number of the divided packets retained in the transmission-side buffer circuit 211 included in the first radio transmission unit 210 is less than or equal to four, the divided packets can be transmitted by radio transmission with a smaller radio transmission delay by being allocated to the first radio transmission unit 210.

When four of the divided packets are retained in the transmission-side buffer circuit 211 included in the first radio transmission unit 210, only one of the divided packet is allocated to the second radio transmission unit 220. After that, the divided packets are allocated again to the first radio transmission unit 210. With such an operation, an opposite radio communication device at the reception side can receive the divided packets after 4 µs with a minimum radio transmission delay.

Figure 4:
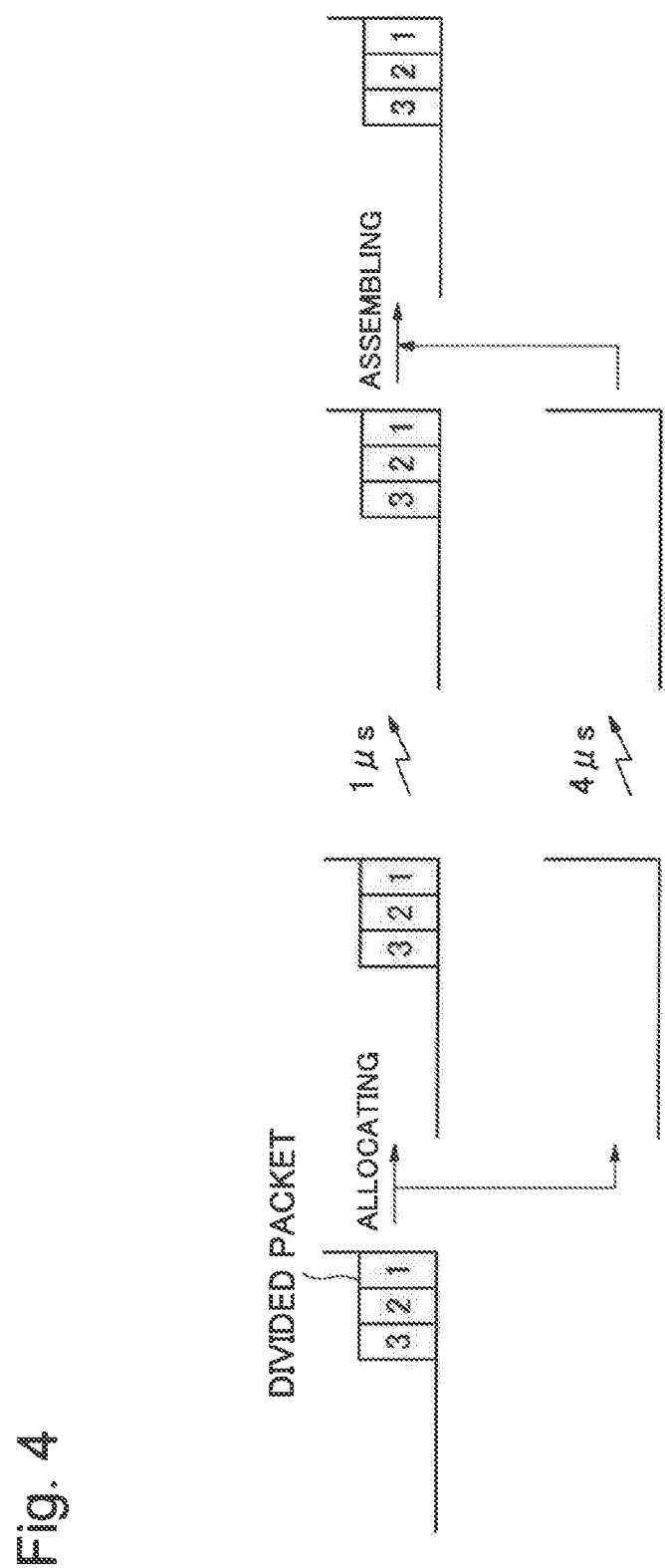
FIG. 4 is a schematic diagram illustrating an operation of the radio communication device according to the second example embodiment of the present invention.

Note that, when the radio transmission rate of the first radio transmission unit 210 is larger than the input rate of the input data signal, the divided packets are not retained in the transmission-side buffer circuit 211 included in the first radio transmission unit 210 as illustrated in FIG. 4. In this case, by using only the first radio transmission unit 210, it is possible to transmit the divided packets with a smaller radio transmission delay (first radio transmission delay) than the case in which the divided packets are allocated in the second radio transmission unit 220.

As illustrated in FIG. 3, according to the radio communication device 200 of the present example embodiment, an order of the divided packets is not reversed when the divided packets are reassembled in the opposite radio communication device at the reception side. Accordingly, the divided packets may be reassembled in an order of reception. Therefore, a memory resource may be included only for using to reassemble the divided packets, and it is not necessary to include a large amount of memory resources for waiting for the arrival of the divided packets.

Figure 5:
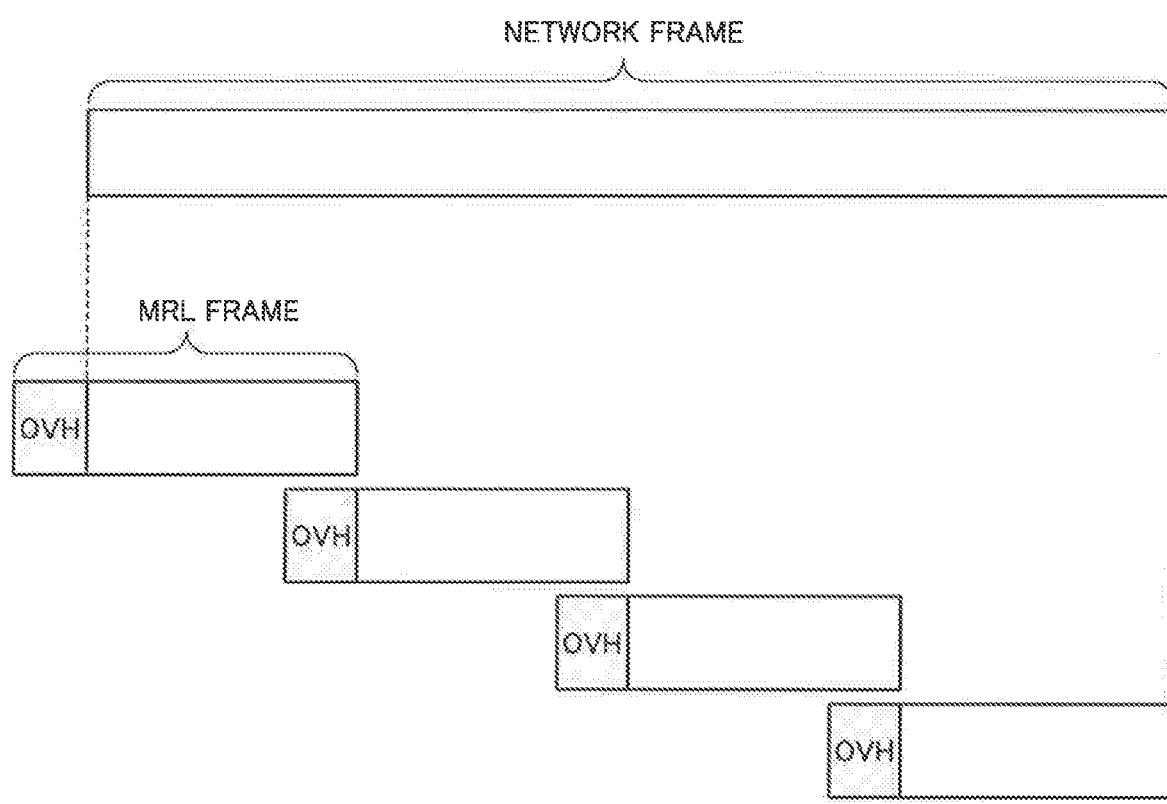
FIG. 5 is a schematic diagram illustrating division of a frame in a related radio transmission system.
Figure 9:
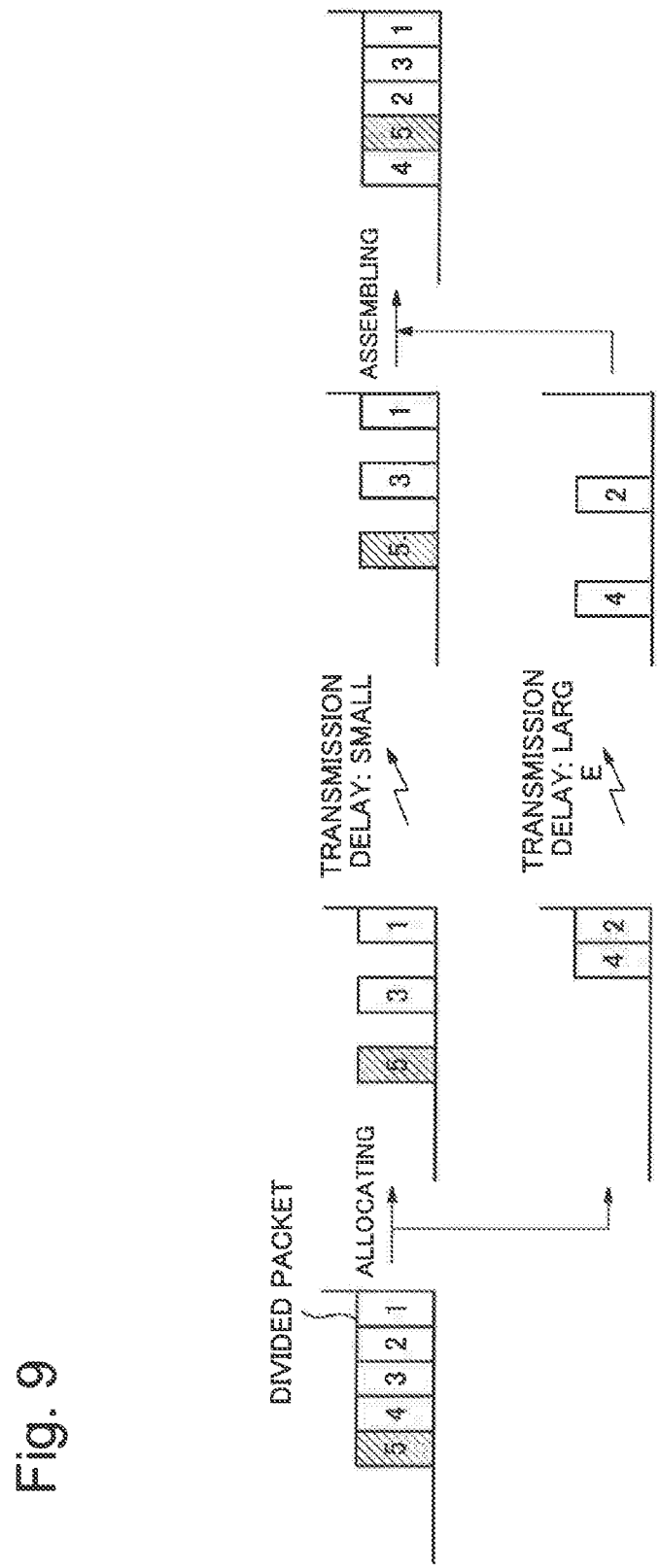
FIG. 9 is a schematic diagram illustrating allocation of a divided frame in the related radio transmission system.

On the other hand, in the related radio transmission system described in Background Art, it is configured that MRL frames are allocated on a radio link basis as described above. However, a transmission delay caused by passing through a radio transmission unit is not taken into consideration. Thereby, as illustrated in FIG. 9, an order of divided packets arriving at an assembling side is reversed. Therefore, in the related radio transmission system, it is necessary to add a sequence identifier (ID) that indicates an order of divided MRL frames as an over head (OVH) when the MRL frames are divided, as illustrated in FIG. 5. This overhead (OVH) is used only for rearranging the MRL frames in order when the MRL frames are reassembled, and thereby there is a problem of a decrease in throughput caused by adding the overhead.

Further, in the related radio transmission system, it is necessary to wait for the arrival of divided packets at the assembling side in the case that an order of the arriving divided packets at the reception side is reversed. Therefore, a memory resource is required to store the divided packets. The amount of memory resources required in this case is an amount of data equivalent to a product of a retention delay of divided packets being retained in a radio device having a large radio transmission delay and a radio transmission rate of a radio device having a small radio transmission delay, and thereby a large amount of memory resources are required.

According to the radio communication device 200 of the present example embodiment, however, an order of divided packets at a reception side is not reversed as described above, and thereby it is possible to avoid the problem such as a decrease in throughput caused by adding an overhead or an increase in memory resource.

Third Example Embodiment

Figure 6:
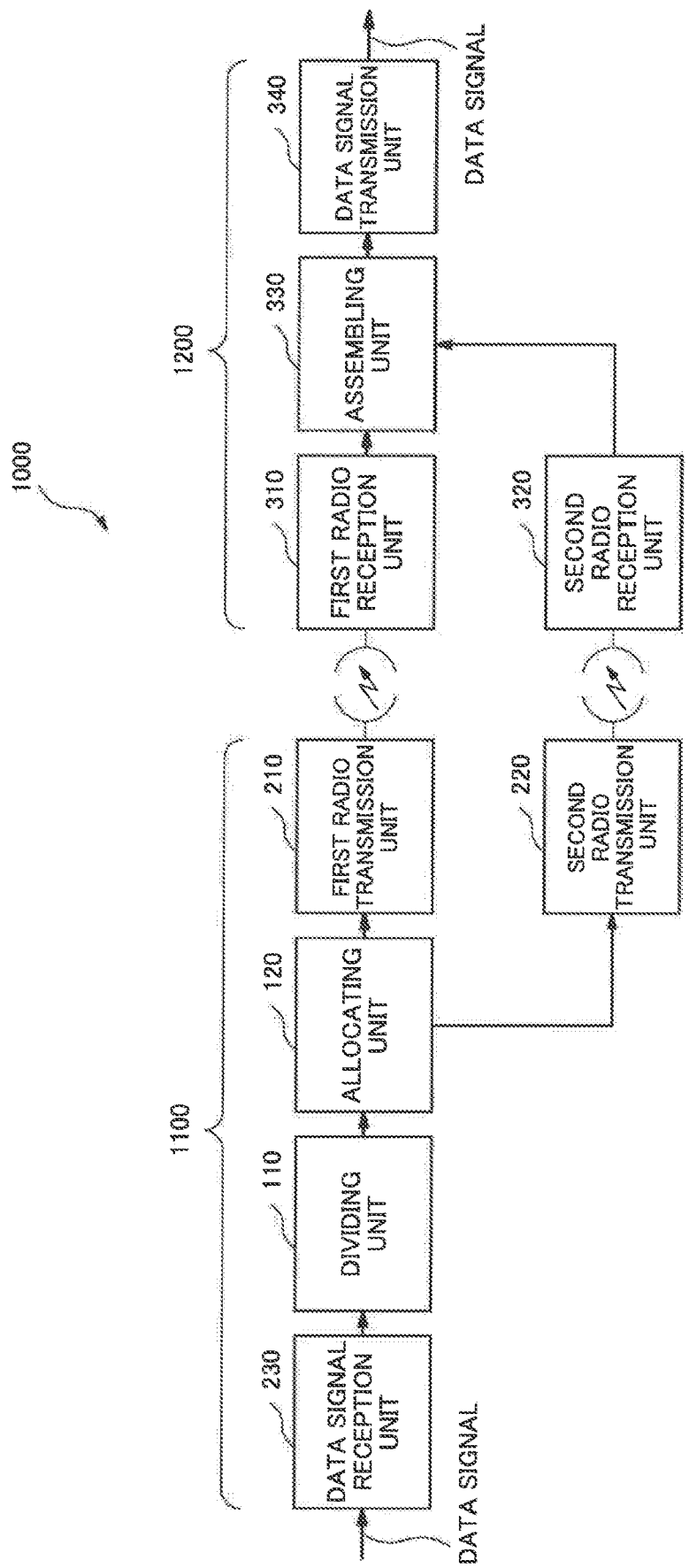
FIG. 6 is a block diagram illustrating a configuration of a radio communication system according to a third example embodiment of the present invention.

Next, a third example embodiment of the present invention is described. FIG. 6 is a block diagram illustrating a configuration of a radio communication system 1000 according to the third example embodiment of the present invention.

The radio communication system 1000 according to the present example embodiment includes a first radio communication device 1100 and a second radio communication device 1200.

The configuration of the first radio communication device 1100 is similar to the configuration of the radio communication device 200 according to the second example embodiment. In other words, the first radio communication device 1100 includes a data signal reception unit 230, a dividing unit 110, an allocating unit 120, and plurality of radio transmission units (a first radio transmission unit 210 and a second radio transmission unit 220).

The data signal reception unit 230 receives a data signal (data signal string). The dividing unit 110 divides the data signal string into a plurality of divided signal strings. The plurality of radio transmission units transmit the divided signal strings with respective different radio transmission delays. Then, the allocating unit 120 allocates the divided signal strings to at least one of the plurality of radio transmission units, based on a transmission delay caused by passing through the radio transmission unit.

On the other hand, the second radio communication device 1200 includes a plurality of radio reception units (a first radio reception unit 310 and a second radio reception unit 320), an assembling unit (assembling means) 330, and a data signal transmission unit 340.

The plurality of radio reception units receive respective divided signal strings transmitted by the plurality of radio transmission units (the first radio transmission unit 210 and the second radio transmission unit 220), and generate received divided signal strings. The assembling unit 330 reproduces the data signal string from this received divided signal strings. Then, the data signal transmission unit 340 transmits the reproduced digital signal string.

Herein, the first radio transmission unit 210 included in the plurality of radio transmission units transmits a digital signal with the first radio transmission delay. Further, the second radio transmission unit 220 included in the plurality of radio transmission unit transmits a digital signal with the second radio transmission delay larger than the first radio transmission delay. In this case, first, the allocating unit 120 allocates the divided signal strings to the first radio transmission unit 210. Then, it can be configured to allocate the divided signal strings to the second radio transmission unit 220, when a retention delay caused by the divided signal strings being retained in the first radio transmission unit 210 is equal to or larger than the second radio transmission delay.

Figure 7:
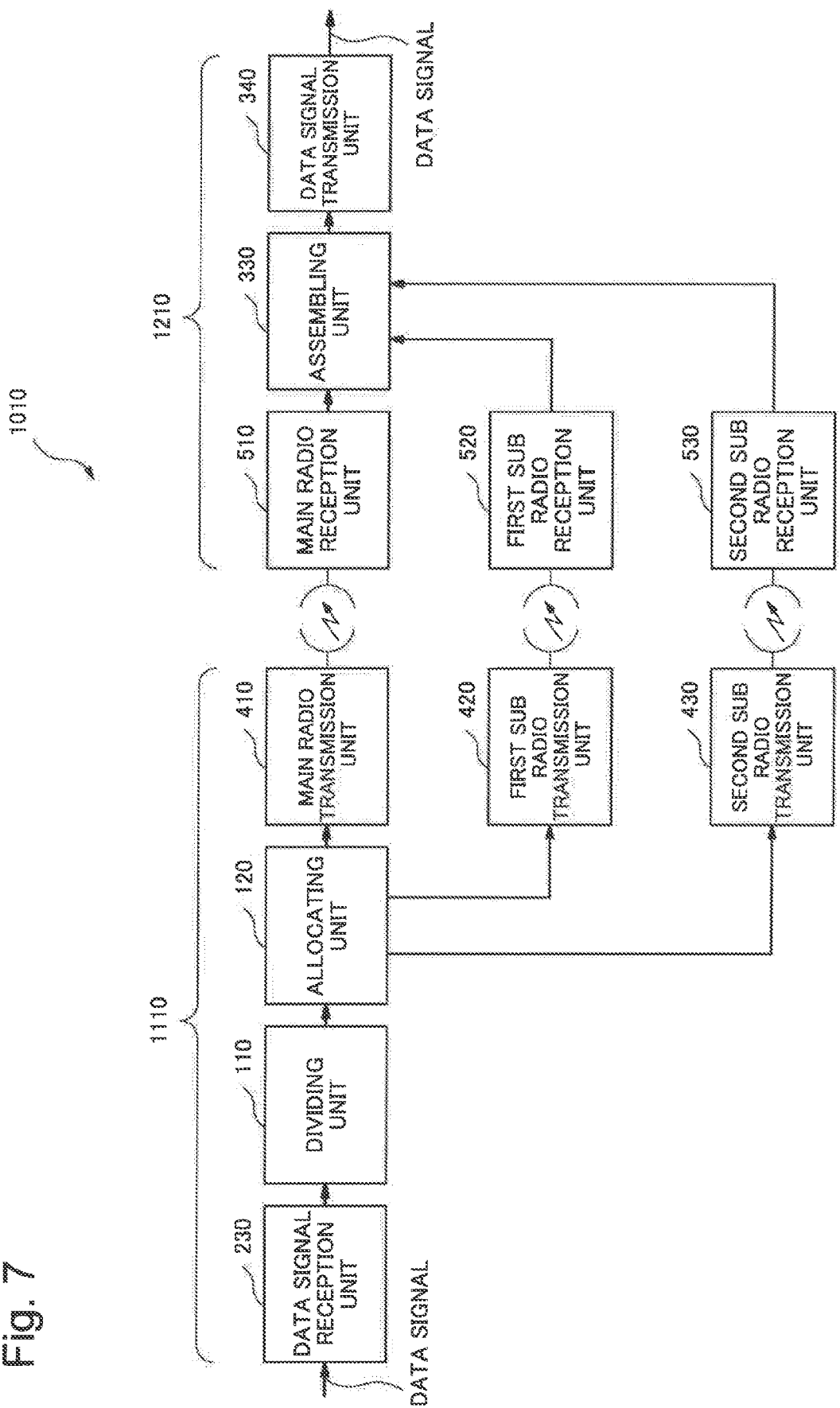
FIG. 7 is a block diagram illustrating another configuration of the radio communication system according to the third example embodiment of the present invention.

Next, another configuration of a radio communication system according to the present example embodiment is described with reference to FIG. 7. In this radio communication system 1010, it is configured that a first radio communication device 1110 includes three or more radio transmission units and a second radio communication device 1210 includes three or more radio reception units. FIG. 7 indicates that the first radio communication device 1110 is configured to include three radio transmission units and the second radio communication device 1210 is configured to include three radio reception units. Specifically, the first radio communication device 1110 includes, as a plurality of radio transmission units, a main radio transmission unit 410, a first sub radio transmission unit 420 and a second sub radio transmission unit 430. Further, the second radio communication device 1210 includes, as a plurality of radio reception units, a main radio reception unit 510, a first sub radio reception unit 520 and a second sub radio reception unit 530. Other configuration is similar to the configuration of the radio communication system 1000.

Next, an operation of the radio communication system 1010 according to the present example embodiment is described. In the radio communication system 1010, it is assumed that a third radio transmission unit being one radio transmission unit included in the plurality of radio transmission units transmits a digital signal with a third radio transmission delay.

At the moment, the allocating unit 120 allocates divided signal strings (divided packets) to the third radio transmission unit, when a third transmission delay caused by passing through the third radio transmission unit is smaller than any of the transmission delays caused by passing through the radio transmission units having radio transmission delays smaller than the third radio transmission delay.

Herein, the transmission delay refers to a delay time occurring from divided packets being allocated to a plurality of radio transmission units in the allocating unit 120 included in the first radio communication device 1110 and then being transmitted by radio transmission through the plurality of radio transmission units, until the divided packets reaching the assembling unit 330 included in the second radio communication device 1210. In other words, the transmission delay includes a radio transmission delay and a retention delay caused by divided packets being retained in the radio transmission units.

An operation of the allocating unit 120 in the radio communication device 1010 according to the present example embodiment is specifically described below. Herein, it is assumed that, in each radio transmission unit, the radio transmission delay in the main radio transmission unit 410 is the smallest, and the radio transmission delay becomes larger in the order of the first sub radio transmission unit 420 and the second sub radio transmission unit 430.

First, the allocating unit 120 allocates divided packets to the main radio transmission unit 410 having the smallest radio transmission delay. However, when (first allocation condition) a transmission delay caused by passing through the first sub radio transmission unit 420 is smaller than the transmission delay caused by passing through the main radio transmission unit 410, the allocating unit 120 allocates the divided packets to the first sub radio transmission unit 420.

Herein, the transmission delay by the main radio transmission unit 410 is the sum of the radio transmission delay in the case that radio transmission of a next divided packet is performed by the main radio transmission unit 410 and a retention delay required for performing radio transmission of all of the divided packets retained in the transmission buffer unit in the main radio transmission unit 410. Further, the transmission delay by the first sub radio transmission unit 420 is the sum of the radio transmission delay in the case that radio transmission of a next divided packet is performed by the first sub radio transmission unit 420 and a retention delay required for performing radio transmission of all of the divided packets retained in the transmission buffer unit in the first sub radio transmission unit 420. Therefore, the first allocation condition is represented by the following formula (1).

[Radio transmission delay in the case that radio transmission of a next divided packet is performed by the main radio transmission unit]+ [retention delay by divided packets retained in the transmission buffer unit in the main radio transmission unit]>[radio transmission delay in the case that radio transmission of a next divided packet is performed by the first sub radio transmission unit]+[retention delay by divided packets retained in the transmission buffer unit in the first sub radio transmission unit] (1)

Further, when a second allocation condition and a third allocation condition described below are satisfied simultaneously, the allocating unit 120 allocates the divided packets to the second sub radio transmission unit 430. Herein, the second allocation condition is that the transmission delay caused by passing through the second sub radio transmission unit 430 becomes smaller than the transmission delay caused by passing through the main radio transmission unit 410. Further, the third allocation condition is that the transmission delay caused by passing through the second sub radio transmission unit 430 becomes smaller than the transmission delay caused by the first sub radio transmission unit 420.

Herein, the transmission delay by the second sub radio transmission unit 430 is the sum of the radio transmission delay in the case that radio transmission of a next divided packet is performed by the second sub radio transmission unit 430 and a retention delay required for performing radio transmission of all of the divided packets retained in the transmission buffer unit in the second sub radio transmission unit 430. Therefore, the second allocation condition is represented by the following formula (2).

[Radio transmission delay in the case that radio transmission of a next divided packet is performed by the main radio transmission unit]+ [retention delay by divided packets retained in the transmission buffer unit in the main radio transmission unit]>[radio transmission delay in the case that radio transmission of a next divided packet is performed by the second sub radio transmission unit]+[retention delay by divided packets retained in the transmission buffer unit in the second sub radio transmission unit] (2)

Further, the third allocation condition is represented by the following formula (3).

[Radio transmission delay in the case that radio transmission of a next divided packet is performed by the first sub radio transmission unit]+[retention delay by divided packets retained in the transmission buffer unit in the first sub radio transmission unit]>[radio transmission delay in the case that radio transmission of a next divided packet is performed by the second sub radio transmission unit]+[retention delay by divided packets retained in the transmission buffer unit in the second sub radio transmission unit] (3)

As described above, the allocating unit 120 included in the first radio communication device allocates divided packets to a radio transmission unit having a minimum transmission delay among the plurality of radio transmission units. Therefore, the radio communication systems 1000 and 1010 of the present example embodiment enable suppression of an increase in transmission delay, even when a communication is performed by using a plurality of radio transmission devices having different radio transmission delays and regarding a plurality of radio lines as a single radio line.

Further, the above configuration enables the assembling unit 330 included in the second radio communication device at the reception side to reproduce the original data signal by reassembling the divided packets in order of arrival. Consequently, a decrease in throughput caused by an increase in overhead can be avoided, and a memory resource for waiting for an arrival of each divided packet at the reception side is not required.

Fourth Example Embodiment

Next, a fourth example embodiment of the present invention is described. A radio communication system according to the present example embodiment is able to deal with an adaptive modulation method and differs from the radio communication systems 1000 and 1010 according to the third example embodiment with regard to the following points.

Specifically, a dividing unit included in a first radio communication device that constitutes the radio communication system according to the present example embodiment adds order information (sequence ID) to divided signal strings (divided packets). Further, a second radio communication device that constitutes the radio communication system according to the present example embodiment includes a storing unit (memory resource) in which the received divided signal strings (received divided signal strings) are accumulated. Herein, an assembling unit included in the second radio communication device reproduces a data signal string from the received divided signal strings accumulated in the storing unit, based on the order information. Other configuration is similar to the configurations of the radio communication systems 1000 and 1010 according to the third example embodiment.

An allocating unit 120 included in the first radio communication device can be configured to acquire radio transmission delay information from a radio transmission unit when using the adaptive modulation method. Further, the allocating unit 120 may be configured to include a table associated with a modulation method and the radio transmission delay information. In this case, the allocating unit 120 acquires the modulation method information from the radio transmission unit and can select the radio transmission delay information by referring to the table.

Figure 8:
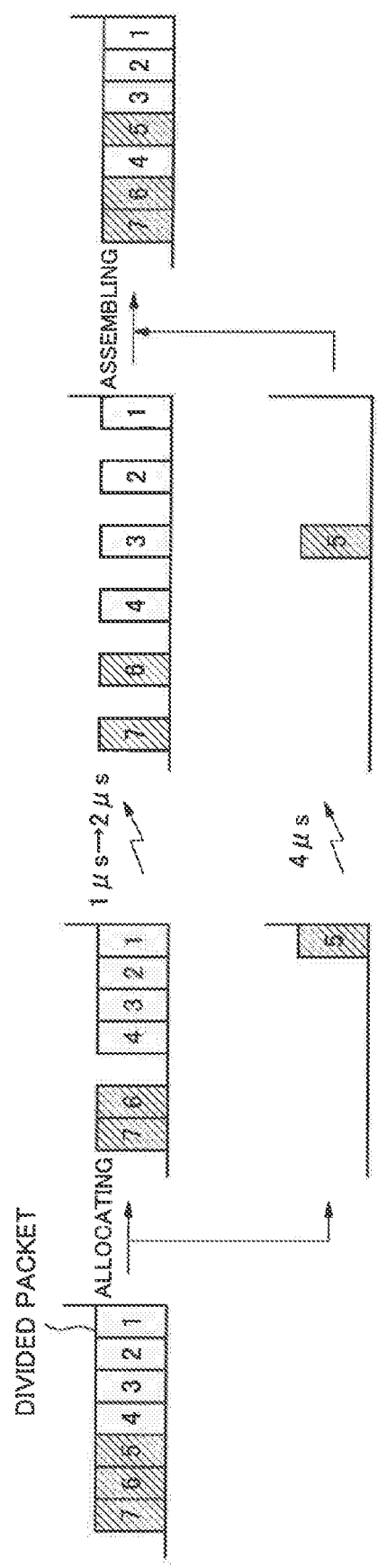
FIG. 8 is a schematic diagram illustrating an operation of a radio communication system according to a fourth example embodiment of the present invention.

An operation of the radio communication system according to the present example embodiment employing an adaptive modulation method is described in FIG. 8.

When a modulation method of the first radio transmission unit for transmitting a digital signal with a first radio transmission delay is changed, for example, when higher-order modulation is changed to lower-order modulation, the radio transmission delay becomes large since the radio transmission delay depends on a radio transmission rate. For example, 1 microsecond (μs) turns 2 microseconds (μs) (upper part of FIG. 8). Thereby, a retention delay by divided packets being retained in a reception-side buffer circuit included in a first radio reception unit also becomes large. Consequently, an order of the divided packets is reversed in the assembling unit included in the second radio communication device (see FIG. 8).

Herein, the radio communication system according to the present example embodiment is configured to add a sequence ID to divided packets in the dividing unit and include a memory resource in the second radio communication device. Therefore, the radio communication system according to the present example embodiment enables arriving divided packets to be waited at the memory resource and be rearranged according to the sequence ID.

A maximum amount of data of the memory resource in this case is the product of a retention delay by divided packets being retained in the first radio reception unit on the side where a radio transmission delay is small and the radio transmission rate of the second radio transmission unit having a large radio transmission delay. In other words, the maximum amount of data is represented by the following equation (4).

[A maximum amount of data in the radio communication system according to the present example embodiment]=[retention delay by divided packets being retained in the first radio reception unit on the side where a radio transmission delay is small]×[radio transmission rate of the second radio transmission unit having a large radio transmission delay] (4)

On the other hand, in the related radio transmission system for allocating divided packets by a round robin method or the like, a required maximum amount of data of memory resource is larger than the radio communication system according to the present example embodiment. The reason is described below.

A maximum amount of data of memory resource in the related radio transmission system is a product of a retention delay by divided packets being retained in the second radio reception unit on the side where the radio transmission delay is large and a radio transmission rate in the first radio transmission unit having a small radio transmission delay. In other words, the maximum amount of data is represented by the following equation (5).

[A maximum amount of data in the related radio transmission system]=[retention delay by divided packets being retained in the second radio reception unit on the side where the radio transmission delay is large]×[radio transmission rate in the first radio transmission unit having a small radio transmission delay] (5)

Herein, in general, a radio transmission rate in a radio transmission unit having a small radio transmission delay is large, and a radio transmission rate in a radio transmission unit having a large radio transmission delay is small. Thereby, the radio communication system according to the present example embodiment is able to reduce a required maximum amount of data of memory resource more than the related radio transmission system.

As described above, the radio communication system according to the present example embodiment enables suppression of an increase in transmission delay with a small amount of memory resource, even when a communication is performed by using a plurality of radio transmission devices having different radio transmission delays and regarding a plurality of radio lines as a single radio line.

In each of the example embodiments described above, a used radio band (band) may be the same or different, as long as radio transmission delays are different from one another in a plurality of radio transmission units. For example, a similar effect can be obtained even when a same radio band (band) is used or the above example embodiments are applied to a radio transmission device whose radio transmission delay is widely different by a modulation method.

The whole or part of the example embodiments disclosed above can be described as, but not limited to, the following supplementary notes.

[Supplementary Note 1]

A radio communication device, comprising:

dividing means for dividing a data signal string into a plurality of divided signal strings; and allocating means for allocating the divided signal strings to at least one of a plurality of radio transmission means having different radio transmission delays, based on a transmission delay caused by passing through the radio transmission means.

[Supplementary Note 2]

The radio communication device according to Supplementary Note 1, wherein the allocating means allocates the divided signal strings to radio transmission means having the minimum transmission delay among the plurality of radio transmission means.

[Supplementary Note 3]

The radio communication device according to Supplementary Note 1 or 2, wherein the transmission delay includes the radio transmission delay and a retention delay caused by the divided signal strings being retained in the radio transmission means, and the radio transmission delay includes a first delay based on a radio transmission speed of the radio transmission means, and a second delay based on a processing time for the divided signal strings.

[Supplementary Note 4]

The radio communication device according to any one of Supplementary Notes 1 to 3, wherein the dividing means divides the data signal string into fixed-length divided signal strings.

[Supplementary Note 5]

The radio communication device according to Supplementary Note 3, further comprising the plurality of radio transmission means, wherein the plurality of radio transmission means each include first radio transmission means for transmitting a digital signal with a first radio transmission delay and second radio transmission means for transmitting a digital signal with a second radio transmission delay being larger than the first radio transmission delay, and the allocating means allocates the divided signal strings to the first radio transmission means, and, when the retention delay in the first radio transmission means is equal to or larger than the second radio transmission delay, allocates the divided signal strings to the second radio transmission means.

[Supplementary Note 6]

The radio communication device according to Supplementary Note 3, further comprising the plurality of radio transmission means, wherein the plurality of radio transmission means each include third radio transmission means for transmitting a digital signal with a third radio transmission delay, and the allocating means allocates the divided signal strings to the third radio transmission means when a third transmission delay caused by passing through the third radio transmission means is smaller than any of the transmission delays caused by passing through the radio transmission means having radio transmission delays smaller than the third radio transmission delay.

[Supplementary Note 7]

The radio communication device according to Supplementary Note 5 or 6, wherein the plurality of radio transmission means each include transmission-side buffer means, and the retention delay is a delay until all of the divided signal strings retained in the transmission-side buffer means are transmitted by radio transmission.

[Supplementary Note 8]

The radio communication device according to any one of Supplementary Notes 1 to 7, wherein the allocating means holds information related to the radio transmission delay.

[Supplementary Note 9]

The radio communication device according to any one of Supplementary Notes 1 to 7, wherein the allocating means acquires information related to the radio transmission delay from each of the plurality of radio transmission means.

[Supplementary Note 10]

The radio communication device according to any one of Supplementary Notes 1 to 9, wherein the dividing means adds order information to the divided signal strings.

[Supplementary Note 11]

A radio communication system, comprising:

a first radio communication device that includes dividing means for dividing a data signal string into a plurality of divided signal strings, a plurality of radio transmission means for transmitting each of the divided signal strings with a different radio transmission delay, and allocating means for allocating the divided signal strings to at least one of the plurality of radio transmission means, based on a transmission delay caused by passing through the radio transmission means; and a second radio communication device that includes a plurality of radio reception means for receiving the divided signal strings transmitted by the plurality of radio transmission means and generating received divided signal strings, and assembling means for reproducing the data signal string from the received divided signal strings.

[Supplementary Note 12]

The radio communication system according to Supplementary Note 11, wherein the plurality of radio transmission means each include first radio transmission means for transmitting a digital signal with a first radio transmission delay, and second radio transmission means for transmitting a digital signal with a second radio transmission delay being larger than the first radio transmission delay, and the allocating means
allocates the divided signal strings to the first radio transmission means, and,
allocates the divided signal strings to the second radio transmission means when a retention delay caused by the divided signal strings being retained in the first radio transmission means is equal to or larger than the second radio transmission delay.

[Supplementary Note 13]

The radio communication system according to Supplementary Note 11, wherein
the plurality of radio transmission means each include third radio transmission means for transmitting a digital signal with a third radio transmission delay, and
the allocating means allocates the divided signal strings to the third radio transmission means when a third transmission delay caused by passing through the third radio transmission means is smaller than any of the transmission delays caused by passing through the radio transmission means having radio transmission delays smaller than the third radio transmission delay.

[Supplementary Note 14]

The radio communication system according to any one of Supplementary Notes 11 to 13, wherein
the dividing means adds order information to the divided signal strings,
the second radio communication device further includes storing means for accumulating the received divided signal strings, and
the assembling means reproduces the data signal string from the received divided signal strings accumulated in the storing means, based on the order information.

[Supplementary Note 15]

A radio communication method, comprising:
dividing a data signal string into a plurality of divided signal strings; and
allocating the divided signal strings to at least one of a plurality of radio transmission means having different radio transmission delays, based on a transmission delay caused by passing through the radio transmission means.

[Supplementary Note 16]

The radio communication method according to Supplementary Note 15, wherein
allocating the divided signal strings includes allocating the divided signal strings to radio transmission means having the minimum transmission delay among the plurality of radio transmission means.

[Supplementary Note 17]

The radio communication method according to Supplementary Note 15 or 16, wherein
the plurality of radio transmission means each include first radio transmission means for transmitting a digital signal with a first radio transmission delay, and second radio transmission means for transmitting a digital signal with a second radio transmission delay larger than the first radio transmission delay, and
allocating the divided signal strings includes allocating the divided signal strings to the first radio transmission means, and allocating the divided signal strings to the second radio transmission means when a retention delay caused by the divided signal strings being retained in the first radio transmission means is equal to or larger than the second radio transmission delay.

[Supplementary Note 18]

The radio communication method according to Supplementary Note 15 or 16, wherein
the plurality of radio transmission means each include third radio transmission means for transmitting a digital signal with a third radio transmission delay, and
allocating the divided signal strings includes: allocating the divided signal strings to the third radio transmission means when a third transmission delay caused by passing through the third radio transmission means is smaller than any of the transmission delays caused by passing through the radio transmission means having radio transmission delays smaller than the third radio transmission delay.

[Supplementary Note 19]

The radio communication method according to any one of Supplementary Notes 15 to 18, further comprising:
generating a received divided signal string by receiving each of the divided signal strings transmitted by each of the plurality of radio transmission means; and
reproducing the data signal string from the received divided signal strings.

[Supplementary Note 20]

The radio communication method according to Supplementary Note 19, wherein
dividing the data signal string includes adding order information to the divided signal strings, and
reproducing the data signal string includes reproducing the data signal string from the received divided signal strings, based on the order information.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

10 Radio transmission unit
100, 200 Radio communication device
110 Dividing unit
120 Allocating unit
210 First radio transmission unit
211 Transmission-side buffer circuit
212 Radio transmission circuit
220 Second radio transmission unit
230 Data signal reception unit
310 First radio reception unit
320 Second radio reception unit
330 Assembling unit
340 Data signal transmission unit
410 Main radio transmission unit
420 First sub radio transmission unit
430 Second sub radio transmission unit
510 Main radio reception unit
520 First sub radio reception unit
530 Second sub radio reception unit
1000, 1010 Radio communication system
1100, 1110 First radio communication device
1200, 1210 Second radio communication device

The invention claimed is:

1. A radio communication device, comprising:
a dividing unit configured to divide a data signal string into a plurality of divided signal strings; and
an allocating unit configured to allocate the divided signal strings to at least one of a plurality of radio transmission units having different radio transmission delays, based on a transmission delay caused by passing through the radio transmission units, wherein
the transmission delay includes the radio transmission delay and a retention delay caused by the divided signal strings being retained in the radio transmission unit, and
the radio transmission delay includes a first delay based on a radio transmission speed of the radio transmission unit, and a second delay based on a processing time for the divided signal strings,
wherein the radio communication device further comprises a plurality of radio transmission units, wherein
the plurality of radio transmission units each include a first radio transmission unit configured to transmit a digital signal with a first radio transmission delay and a second radio transmission unit configured to transmit a digital signal with a second radio transmission delay being larger than the first radio transmission delay, and
the allocating unit allocates the divided signal strings to the first radio transmission unit, and, when the retention delay in the first radio transmission unit is equal to or larger than the second radio transmission delay, allocates the divided signal strings to the second radio transmission unit.

2. The radio communication device according to claim 1, wherein
the allocating unit allocates the divided signal strings to the radio transmission unit having a minimum transmission delay among the plurality of radio transmission units.

3. The radio communication device according to claim 1, wherein
the dividing unit divides the data signal string into fixed-length divided signal strings.

4. The radio communication device according to claim 1 wherein
the plurality of radio transmission units each include a transmission-side buffer unit, and
the retention delay is a delay until all of the divided signal strings retained in the transmission-side buffer unit are transmitted by radio transmission.

5. The radio communication device according to claim 1, wherein
the allocating unit holds information related to the radio transmission delay.

6. The radio communication device according to claim 1, wherein
the allocating unit acquires information related to the radio transmission delay from each of the plurality of radio transmission units.

7. The radio communication device according to claim 1, wherein
the dividing unit adds order information to the divided signal strings.

8. A radio communication system, comprising:
a first radio communication device that includes
a dividing unit configured to divide a data signal string into a plurality of divided signal strings,
a plurality of radio transmission units configured to transmit each of the divided signal strings with a different radio transmission delay, and
an allocating unit configured to allocate the divided signal strings to at least one of the plurality of radio transmission units, based on a transmission delay caused by passing through the radio transmission unit; and
a second radio communication device that includes
a plurality of radio reception units configured to receive the divided signal strings transmitted by the plurality of radio transmission units and generate received divided signal strings, and
an assembling unit configured to reproduce the data signal string from the received divided signal strings,
wherein
the plurality of radio transmission units each include a first radio transmission unit configured to transmit digital signal with a first radio transmission delay, and a second radio transmission unit configured to transmit a digital signal with a second radio transmission delay being larger than the first radio transmission delay, and
the allocating unit
allocates the divided signal strings to the first radio transmission unit, and,
allocates the divided signal strings to the second radio transmission unit when a retention delay caused by the divided signal strings being retained in the first radio transmission unit is equal to or larger than the second radio transmission delay.

9. The radio communication system according to claim 8, wherein
the dividing unit adds order information to the divided signal strings,
the second radio communication device further includes a storing unit configured to accumulate the received divided signal strings, and
the assembling unit reproduces the data signal string from the received divided signal strings accumulated in the storing unit, based on the order information.

10. A radio communication method, comprising:
dividing a data signal string into a plurality of divided signal strings; and
allocating the divided signal strings to at least one of a plurality of radio transmission units having different radio transmission delays, based on a transmission delay caused by passing through the radio transmission unit,
wherein
the plurality of radio transmission units each include a first radio transmission unit configured to transmit a digital signal with a first radio transmission delay, and a second radio transmission unit configured to transmit a digital signal with a second radio transmission delay larger than the first radio transmission delay, and
allocating the divided signal strings includes allocating the divided signal strings to the first radio transmission unit, and allocating the divided signal strings to the second radio transmission unit when a retention delay caused by the divided signal strings being retained in the first radio transmission unit is equal to or larger than the second radio transmission delay.

11. The radio communication method according to claim 10, wherein
allocating the divided signal strings includes allocating the divided signal strings to the radio transmission unit having the minimum transmission delay among the plurality of radio transmission units.

12. The radio communication method according to claim 10, further comprising:
generating a received divided signal string by receiving each of the divided signal strings transmitted by each of the plurality of radio transmission units; and
reproducing the data signal string from the received divided signal strings.

13. The radio communication method according to claim 12, wherein
dividing the data signal string includes adding order information to the divided signal strings, and
reproducing the data signal string includes reproducing the data signal string from the received divided signal strings, based on the order information.

\* \* \* \* \*